Figure 1:
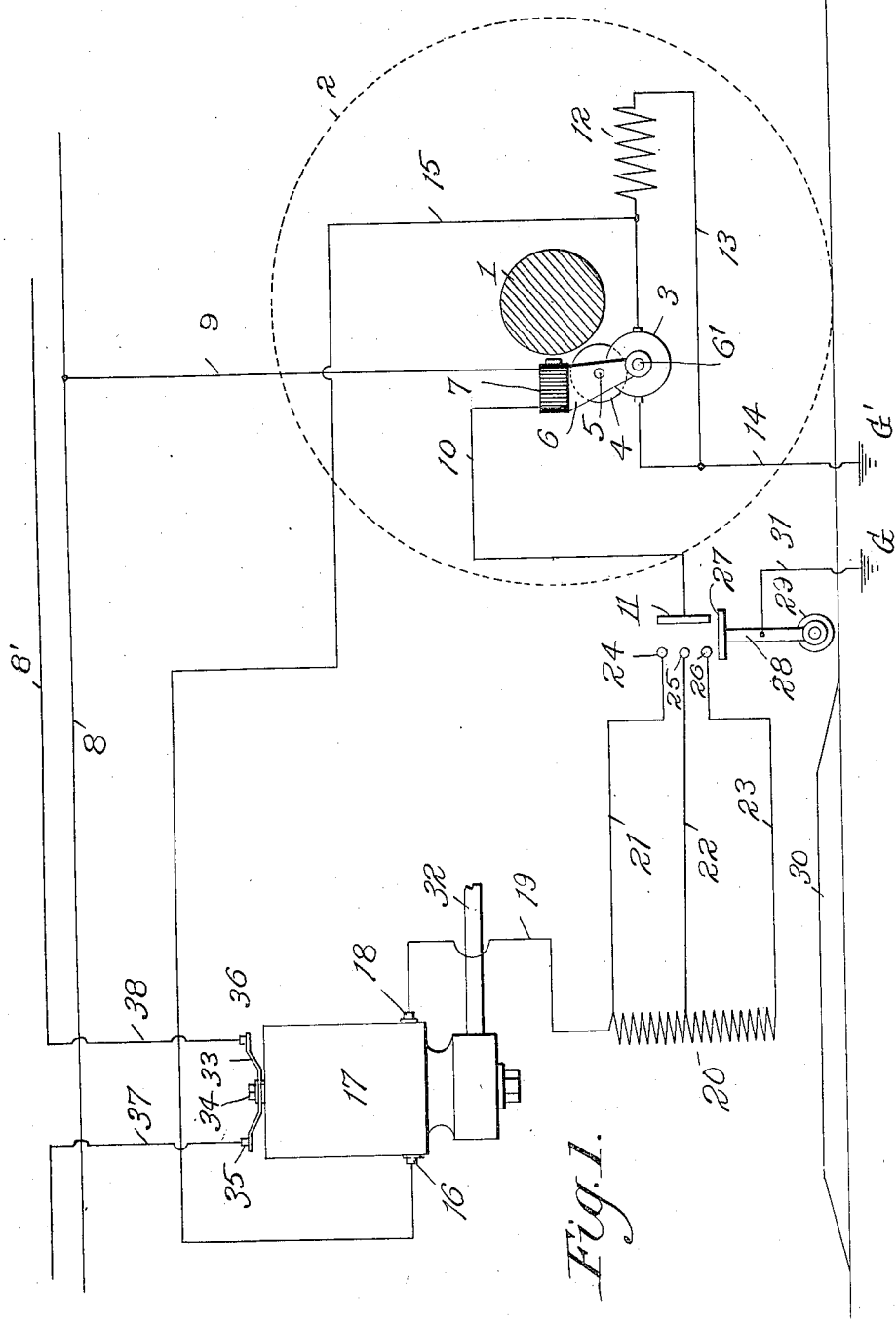

W. S. MENDEN.
SPEED CONTROL DEVICE.
APPLICATION FILED SEPT. 8, 1913.

1,132,205.

Patented Mar. 16, 1915.
3 SHEETS—SHEET 2.

Witnesses:
Wm. A. Courtland

Inventor
William S. Menden
By his Attorneys
Knight Bros

W. S. MENDEN.
SPEED CONTROL DEVICE.
APPLICATION FILED SEPT. 8, 1913.

1,132,205.

Patented Mar. 16, 1915.
3 SHEETS—SHEET 3.

Witnesses:
Wm. A. Courtland
A. Wright

Inventor
William S. Menden
By his Attorneys
Knight Bros.

UNITED STATES PATENT OFFICE.

WILLIAM S. MENDEN, OF BROOKLYN, NEW YORK, ASSIGNOR TO MEGOSIN COMPANY, INC., A CORPORATION OF NEW YORK.

SPEED-CONTROL DEVICE.

1,132,205.   Specification of Letters Patent.   Patented Mar. 16, 1915.

Application filed September 8, 1913. Serial No. 788,746.

*To all whom it may concern:*

Be it known that I, WILLIAM S. MENDEN, a citizen of the United States, residing in the borough of Brooklyn, county of Kings, and State of New York, have invented certain new and useful Improvements in Speed-Control Devices, of which the following is a full and clear specification.

This invention relates to speed control devices for vehicles and especially such vehicles as rapid transit cars which travel at relatively high speed during some portions of their route but which must be positively limited in speed while passing over other portions of their routes.

The general purpose of the present invention is to provide certain improvements in the system of speed control for vehicles disclosed in my copending application Serial Number 777,238. According to the system disclosed in said application, whenever a predetermined speed limit was exceeded, certain speed-controlling instrumentalities became operative to automatically reduce the speed below such limit.

The primary object of the present invention is to provide improved means for reestablishing normal working conditions under which the vehicle is operated, said means being adapted to enable a regulation of the minimum speed limit at which it becomes operative in reëstablishing normal running conditions.

My invention is exemplified in the drawings in its adaptation to a rapid transit car.

Figure 2:
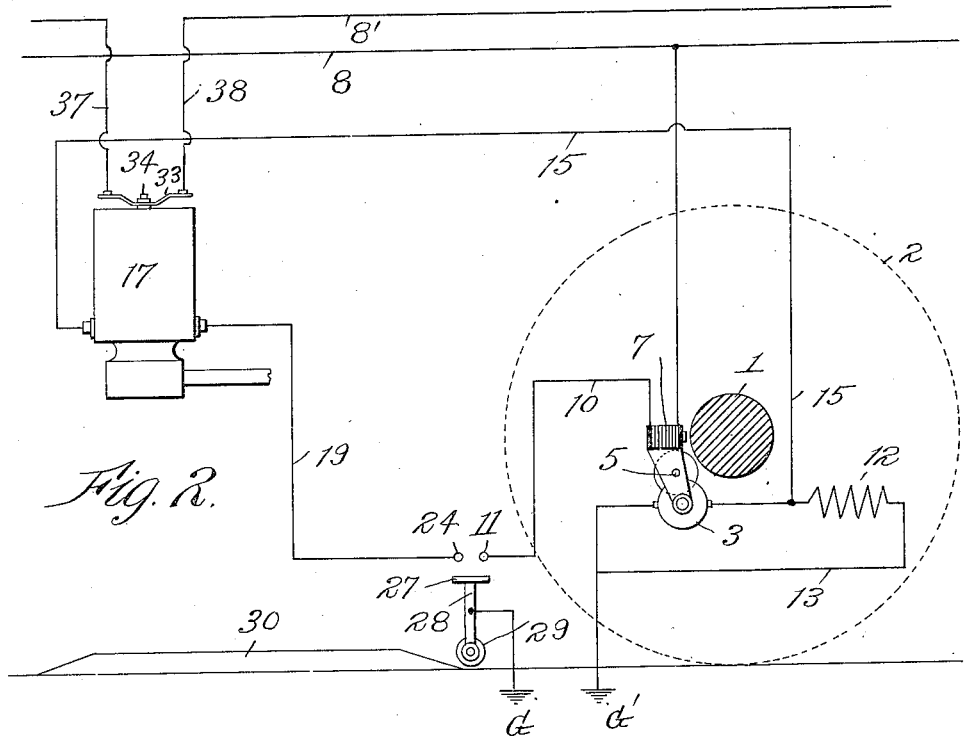
Figure 5:
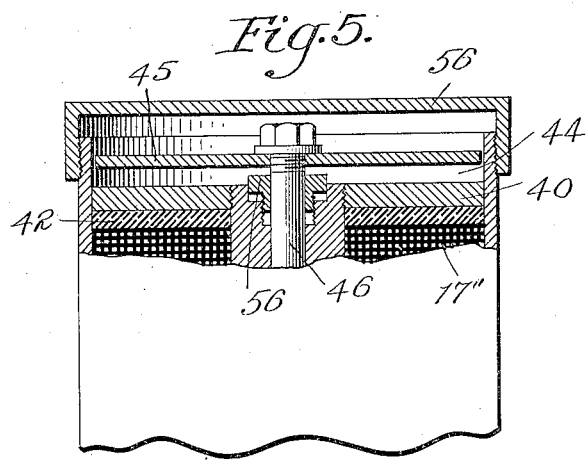
Figure 3:
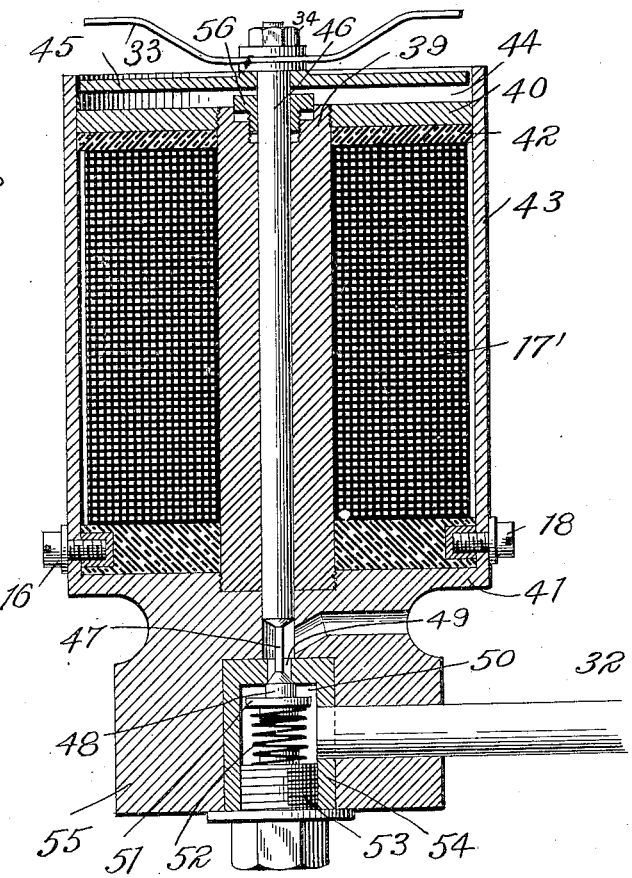
Figure 4:
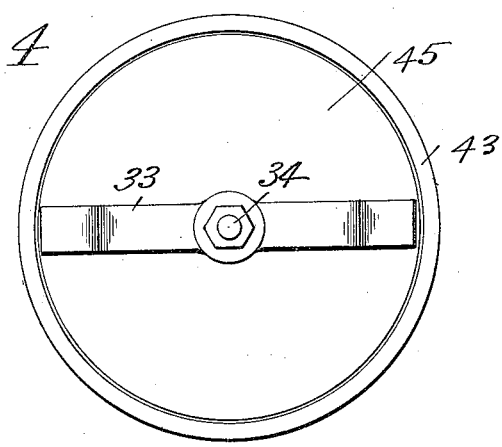

In the drawings,—Figure 1 is a wiring diagram of one embodiment of my invention; Fig. 2 is a modified wiring diagram; Fig. 3 is an axial section of the preferred embodiment of my improved controlling magnet, parts being shown in side elevation; Fig. 4 is a top plan view of the same; and Fig. 5 is a fragmentary side elevation of a modified form of the controlling magnet, parts being broken away and parts shown in section.

According to the embodiment shown in Fig. 1, the axle 1 of the vehicle which is supported by the usual wheels 2 indicated by dotted lines, constitutes one element of an operating system which provides a power that varies proportionally to the speed of the vehicle. Thus said axle constitutes an element which rotates continuously while the car is in motion. A dynamo 3 which is mounted adjacent to the axle 1, forms an auxiliary source of power, said dynamo being driven by means of a roller 4 which is geared thereto. In order to drive the roller 4, it is journaled at 5 in a bracket 6, an electromagnet 7 being mounted on the bracket 6 which is pivoted at 6' on the axis of the dynamo 3. Whenever an electric current is passed through the magnet 7 from a line wire 8 and branch 9 the core of said magnet becomes energized and draws it toward the axle 1, the roller 4 being thereby drawn into running contact with said axle 1. A wire 10 connects the magnet 7 with a contact bar 11. A field winding 12 of the generator 3 is connected by a branch line 13 with the ground line 14 which leads from the generator 3 to the ground at G'. A line wire 15 which leads from the generator 3, connects with a terminal 16 of the solenoid or electromagnet 17, the other terminal 18 of said solenoid or magnet being connected by a line wire 19 with a resistance coil 20. A plurality of branch wires 21, 22 and 23 lead respectively to contacts 24, 25 and 26 and provide means for introducing graded resistances into the operating circuit to be presently referred to. In order to provide suitable and efficient means for closing said operating circuit, a circuit closing bar 27 may be mounted on a plunger 28 which carries at its lower end a roller 29, said roller being adapted to ride over a cam bar 30 which may be disposed at any suitable point along the route of the vehicle to elevate the plunger 28. Said cam bars 30 can be made of varying depths so as to raise the plunger 28 into positions to respectively close the operating circuit across the contact bar 11 and any one of the contacts 24, 25 and 26. A wire 31 which is grounded at G serves to ground the magnet 7 whenever the plunger 28 is operated in the manner referred to. The solenoid or magnet 17 together with its armature or plunger to be presently referred to, constitutes means for actuating an instrumentality for controlling the speed of the vehicle, said instrumentality in the present embodiment consisting of an air brake valve which controls a pipe 32 which leads to suitable air brake operating mechanism.

According to the present embodiment, a circuit closing switch 33 is mounted on the upper end of the plunger 34 in suitable position to bridge the gap between the contacts 35 and 36, the former contact being connected by wire 37 with the line wire 8', and the latter of said contacts being connected by wire 38 to control wire 8'.

According to the embodiment shown in Fig. 2, resistance coil 20 is eliminated and the solenoid or magnet 17 is connected by the line wire 19 with a single contact 24, between which and the contact 11 and the extremity of lead wire 10 is formed a gap. The circuit closing bar 27 which is carried by the plunger 28 is adapted to be raised in suitable position to close the gap between contacts 11 and 24 whenever the roller 29 carried by the lower end of the plunger 28, rides over the contact bar 30.

Referring now to Figs. 3 and 4, the preferred embodiment of my improved solenoid or magnet is shown in its adaptation to the present system of speed control for vehicles. Thus in Fig. 3, the solenoid winding 17' is mounted upon a suitable core 39 which is threaded at either end into suitable metallic disks 40 and 41. Interposed between each of said disks 40 and 41 and the solenoid winding 17', is a layer of insulating material 42. Said disks 40 and 41 serve to close the opposite ends of a cylindrical housing 43 of the solenoid 17', the upper disk 40 being disposed to provide a recess 44 within which an armature disk 45 is adapted to reciprocate. For this purpose, said disk 45 is mounted on the upper end of a plunger 46, which is reciprocably mounted in the central bore of the core 39. The lower end of the plunger 46 is connected by a stem 47 with a valve 48, which normally closes a port 49 leading to the outside atmosphere from a valve chamber 50 with which the air pipe 32 connects. Valve 48 is provided with a disk 51 against which abuts one end of a spring 52, said spring being mounted upon a plug 53 which is threaded to a bushing 54 in the boss 55 which depends from the lower disk 41. Threaded within the upper end of the core 39 is a bushing 56 which by reason of its vertical adjustment, constitutes means for varying the air gap existing between the plate 40 and the armature 45. It will be seen that by this construction, the armature 45 will be displaced under the action of the magnetism from solenoid 17' only when sufficient energy is supplied to said solenoid to affect the disk across said air gap. Moreover, after the armature 45 has been drawn inwardly as far as possible, it will be retained in such position until the size of the air gap causes an interruption due to the drop in current within the solenoid 17', as the speed of the vehicle decreases. This device therefore constitutes means for varying a predetermined minimum speed limit for the vehicle. In the embodiment shown in Fig. 5 a solenoid 17" is adapted to be connected up within either of the controlling circuits shown in Figs. 1 and 2. Inasmuch, however, as this embodiment is designed to control the action of a braking mechanism alone, the circuit closing bar 33 of the embodiments shown in Figs. 1 to 4 included, is eliminated and the upper end of the solenoid housing is closed by a cap 56.

The operation of my improved system will now be understood and briefly described as follows: As a vehicle such as a rapid transit car enters a zone in which the speed is to be limited to a predetermined maximum, the roller 29 carried by the plunger 28 rides over a cam bar 30 with the result that the circuit closing contact bar 27 is caused to bridge the gap between one of the contacts 24, 25 and 26 and the contact bar 11. Immediately the magnet 7 is grounded at G and becomes energized. As a result the roller 4 is drawn into rolling contact with the axle 1 and the generator 3 caused to operate in building up a current which is large or small according to the speed of the vehicle at that instant. If it so happens that the speed of the vehicle is above the predetermined maximum for that zone, the current transmitted from the generator 3 through line 15 to solenoid or magnet 17, line 19, ground line 31 and ground line 14, serves to actuate the armature 45 and cause the valve 51 to be displaced from its seat. Immediately the pipe 32 is open to the outer atmosphere through port 49 and the brakes applied, thus causing a reduction of speed until such time as the magnetism in the solenoid 17 falls to such a point that the air gap between the armature 45 and plate 40 causes a release of the armature 45 and consequent closing of the valve 51. The parts are thereupon automatically returned to normal inoperative position. According to the embodiment shown in Figs. 1 and 2, the actuation of the armature 45 also removes the bar 33 from contacts 35 and 36, thus breaking the control wire 8'. This circuit may be the circuit controlling the main operating circuit of the car. Obviously by adjusting the threaded bushing 56 the size of the air gap existing between the armature in inward position and the disk 40, may be varied so that the solenoid may be caused to release said armature at any desired minimum speed limit within certain practical limits.

What I claim is:

1. In a vehicle, a speed controlling instrumentality under normal tendency to maintain an inoperative position provided with means operated during predetermined zones of travel for rendering it more or less susceptible to be held in operation, a source of power which varies with the speed of the vehicle, and means for connecting said means with said source of power during predetermined zones of travel of said vehicle.

2. In a vehicle, an instrumentality controlling the operation of said vehicle, an electromagnetic device provided with an armature for operating said instrumentality, means for adjusting the size of the air gap between said magnetic device and armature, a source of power which varies to correspond to the speed of the vehicle, a resistance, an electric circuit including said magnetic device, source of power and more or less of said resistance, and means for predetermining the amount of fixed resistance in circuit for a certain zone of travel.

3. In a vehicle, an instrumentality for controlling the operation of said vehicle, an electromagnetic device provided with an armature for operating said instrumentality, means for maintaining an air gap between said magnetic device and armature, a source of power which varies to correspond to the speed of the vehicle, graded resistance, an electric circuit including said magnetic device, source of power, and more or less of said resistance, said circuit being provided with spaced contacts, and means adapted to be operated at predetermined points along the route of said vehicle for closing the space between said contacts.

4. The combination with a vehicle, of a conductor provided with a circuit breaker, an electromagnet, an armature for said magnet connected to said circuit breaker, means for maintaining an air gap between said magnet and armature to prevent the operation of said armature by said magnet under an insufficient supply of current, resistance, a source of energy which varies with the speed of said vehicle, an electric circuit including the above mentioned parts, and means rendered operative during predetermined zones of travel for closing said circuit and determining the amount of such resistance included in circuit.

5. The combination with a vehicle, of a speed controlling instrumentality therefor, an electromagnet, an armature for said magnet connected to said instrumentality, means for maintaining an air gap between said magnet and armature to render the magnet inoperative on said armature under an insufficient supply of current thereto, and an electric circuit for said magnet including a source of energy which varies to correspond with the speed of said vehicle, said circuit being provided with a plurality of stepped resistances adapted to vary the predetermined maximum speed limit of said vehicle with respect to the minimum speed limit therefor.

WILLIAM S. MENDEN.

Witnesses:
J. J. SINCLAIR,
WM. A. COURTLAND.

Copies of this patent may be obtained for five cents each, by addressing the "Commissioner of Patents, Washington, D. C."